(12) United States Patent
Schneider et al.

(10) Patent No.: US 12,259,870 B2
(45) Date of Patent: Mar. 25, 2025

(54) METHOD FOR CHECKING A PROCESSING OF PAYLOAD DATA

(71) Applicant: Robert Bosch GmbH, Stuttgart (DE)

(72) Inventors: Peter Schneider, Holzgerlingen (DE); Sascha Guebner, Bodenburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/319,392

(22) Filed: May 17, 2023

(65) Prior Publication Data

US 2024/0045854 A1 Feb. 8, 2024

(30) Foreign Application Priority Data

Aug. 3, 2022 (DE) .................... 10 2022 208 087.4

(51) Int. Cl.
*G06F 17/00* (2019.01)
*G06F 16/23* (2019.01)
(52) U.S. Cl.
CPC ................................ *G06F 16/2365* (2019.01)
(58) Field of Classification Search
CPC ...... G06F 16/2365; G06F 11/00; G06F 21/57; H04L 67/561
See application file for complete search history.

(56) References Cited

U.S. PATENT DOCUMENTS

| | | | | |
|---|---|---|---|---|
| 11,425,146 | B2* | 8/2022 | Jurk | G08G 1/164 |
| 11,985,139 | B2* | 5/2024 | Werner | H04L 63/123 |
| 2013/0246460 | A1* | 9/2013 | Maltbie | G16B 50/40 |
| | | | | 707/771 |
| 2016/0006844 | A1* | 1/2016 | Tychina | H04L 69/324 |
| | | | | 370/474 |
| 2019/0080111 | A1* | 3/2019 | Patange | G06F 3/0673 |

OTHER PUBLICATIONS

Erik Wittern, Annie T. T. Ying, Yunhui Zheng, Julian Dolby, and Jim A. Laredo. Statically checking web API requests in JavaScript. In Proceedings of the 39th International Conference on Software Engineering. IEEE Press, 244-254. <https://doi.org/10.1109/ICSE.2017.30>, May (Year: 2017).*
Standard ISO 26262-6, Road Vehicles—Functional Safety—Part 6: Product Development At the Software Level, Second Edition, 2018, pp. 1-66.

* cited by examiner

*Primary Examiner* — Greta L Robinson
(74) *Attorney, Agent, or Firm* — NORTON ROSE FULBRIGHT US LLP; Gerard A. Messina (57) ABSTRACT

A method for checking a processing of payload data. The method includes: ascertaining, for each one of multiple sequences of data processing blocks, reference result data that result when predetermined meta data are processed by the sequence of the data processing blocks; receiving payload data result data and meta data result data for a data processing of the payload data and of the meta data; checking whether the meta data result data for at least one sequence of the sequences admissible for the data processing of the payload data agree with reference result data ascertained for the sequence; and triggering a safety measure if the meta data result data for no sequence of the sequences admissible for the data processing agree with the reference result data ascertained for the sequence.

7 Claims, 5 Drawing Sheets

METHOD FOR CHECKING A PROCESSING OF PAYLOAD DATA

CROSS REFERENCE

The present application claims the benefit under 35 U.S.C. § 119 of German Patent Application No. DE 10 2022 208 087.4 filed on Aug. 3, 2022, which is expressly incorporated herein by reference in its entirety.

FIELD

The present invention relates to a method for checking a processing of payload data.

BACKGROUND INFORMATION

Today, safety-critical applications are mostly executed on special hardware developed for this purpose. The safety requirements of the application usually result in hardware requirements with respect to error-proneness and error rates, which often cannot be guaranteed by non-safety-critical commercially widely available hardware such as processors or working memories. Currently, however, there are endeavors to execute safety-critical applications on non-safety-critical hardware nevertheless, since the latter is often markedly more cost-effective and more powerful. In order to make this possible, specific features of the safety-critical hardware, such as a lock-step mode or the like, are emulated by software.

Thus it is possible, for example, to execute a safety-critical calculation on multiple independent non-safety-critical systems, and their results may then be compared in order to detect possible errors. The data paths in such systems are naturally more complex and the system as a whole must ensure adherence to these data paths. Thus, the correct adherence to the processing path (using so-called program flow controls) must be ensured across multiple processing components of a safety-critical application, if for example data must still be preprocessed prior to the actual analysis in order to ensure the correct execution of the application.

For this reason, effective approaches for monitoring data processing operations, in particular with regard to the program flow, are desirable, in particular for distributed data processing systems that are dynamically reconfigurable during run time.

SUMMARY

According to various specific embodiments of the present invention, a method for checking a processing of payload data, comprising ascertaining, for each one of multiple sequences of data processing blocks, reference result data, which result when predetermined meta data are processed by the sequence of the data processing blocks; receiving payload data result data and meta data result data for a data processing of the payload data and of the meta data; checking whether the meta data result data for at least one sequence of the sequences admissible for the data processing of the payload data agree with the reference result data ascertained for the sequence; and triggering a safety measure if the meta data result data for no sequence of the sequences admissible for the data processing agree with the reference result data ascertained for the sequence.

The method described above makes it possible to follow the correct processing path of the data (e.g., from preprocessing, via the analysis, to the decision) even in distributed systems that are dynamically reconfigurable during run time, and thus to ensure the complete processing as well as the correct sequence of the processing steps of a data pipeline in the sense of a program flow control. The above method can be implemented in a simple manner without use of additional special hardware elements (e.g. watchdog) and can thus be implemented on a multitude of "off-the-shelf" devices.

The safety measure comprises, for example, that the payload data result data are discarded and/or calculated anew. In other words, the payload data result data are (only) used (e.g., processed further, e.g., if a control process is performed on their basis), if the meta data result data for at least one sequence of the sequences admissible for the data processing of the payload data agrees with the reference result data ascertained for the sequence.

Various exemplary embodiments are indicated below.

Exemplary embodiment 1 is a method for checking a processing of payload data, as described above.

Exemplary embodiment 2 is a method according to exemplary embodiment 1, further comprising: receiving a specification of a sequence, the admissible sequence being the specified sequence.

This makes it possible to allow for multiple processing paths, while verifying, however, that the processing actually occurred according to the indicated processing path.

Exemplary embodiment 3 is a method according to exemplary embodiment 1, the at least one admissible sequence being an arbitrary sequence of the sequences.

It is thereby checked, whether the processing matches at least one (arbitrary) sequence of the sequences. This allows for flexibility in the processing of the data, e.g. that the processing can be distributed in various ways to data processing units in a cloud as long as the meta data processed by the resulting sequence agrees with one of the reference result data and thus a sequence identified in this manner as an admissible sequence.

Exemplary embodiment 4 is a method according to one of the exemplary embodiments 1 through 3, further comprising: ascertaining, for each sequence, for multiple partial sequences of the sequence, partial sequence reference result data, which result when meta data are processed by the partial sequence of the data processing blocks; receiving partial result data in addition to the result data; checking, in the event that the result data for no sequence of the sequences admissible for data processing agree with the reference result data ascertained for the sequence, whether the partial result data for partial sequence reference data of the at least one admissible sequence agree; and initiating a repetition of the data processing starting at the end of a partial sequence, for which the partial sequence reference data agree with received partial result data.

This makes it possible to avoid repeating a data processing in its entirety if it is determined that it was not carried out in an admissible sequence of data processing blocks and a partial result of the data processing that was produced by an admissible partial sequence of data processing blocks. A recalculation of valid intermediate results is thereby avoided.

Exemplary embodiment 5 is a method according to one of the exemplary embodiments 1 through 4, wherein several of the data processing blocks are implemented by the same data processing device.

A program flow control is performed within the data processing device, i.e. with a finer granularity than at the level of the data processing device. The data processing blocks may thus for example also be program modules or program segments or other functional units within a data processing device.

Exemplary embodiment 6 is a data processing device, which is designed to carry out a method according to one of the exemplary embodiments 1 through 5.

This data processing device is for example a data sink for the processed payload data.

Exemplary embodiment 7 is a computer program including instructions, which, when they are executed by a processor, cause the processor to carry out a method according to one of the exemplary embodiments 1 through 5.

Exemplary embodiment 8 is a computer-readable medium, which stores instructions, which, when they are executed by a processor, cause the processor to carry out a method according to one of the exemplary embodiments 1 through 5.

In the figures, similar reference characters generally refer to the same parts in all the various views. The figures are not necessarily to scale, the emphasis instead being generally placed on illustrating the principles of the present invention. In the following description, various aspects are described with reference to the figures.

DETAILED DESCRIPTION OF EXAMPLE EMBODIMENTS

The following detailed description refers to the figures, which show specific details and aspects of this disclosure for explanation, in which the present invention may be implemented. Other aspects may be used and structural, logical and electrical modifications may be performed, without deviating from the protective scope of the present invention. The various aspects of this disclosure do not necessarily preclude one another since some aspects of this disclosure may be combined with one or multiple other aspects of this disclosure to form new aspects.

Various examples are describe in more detail below.

Figure 1:
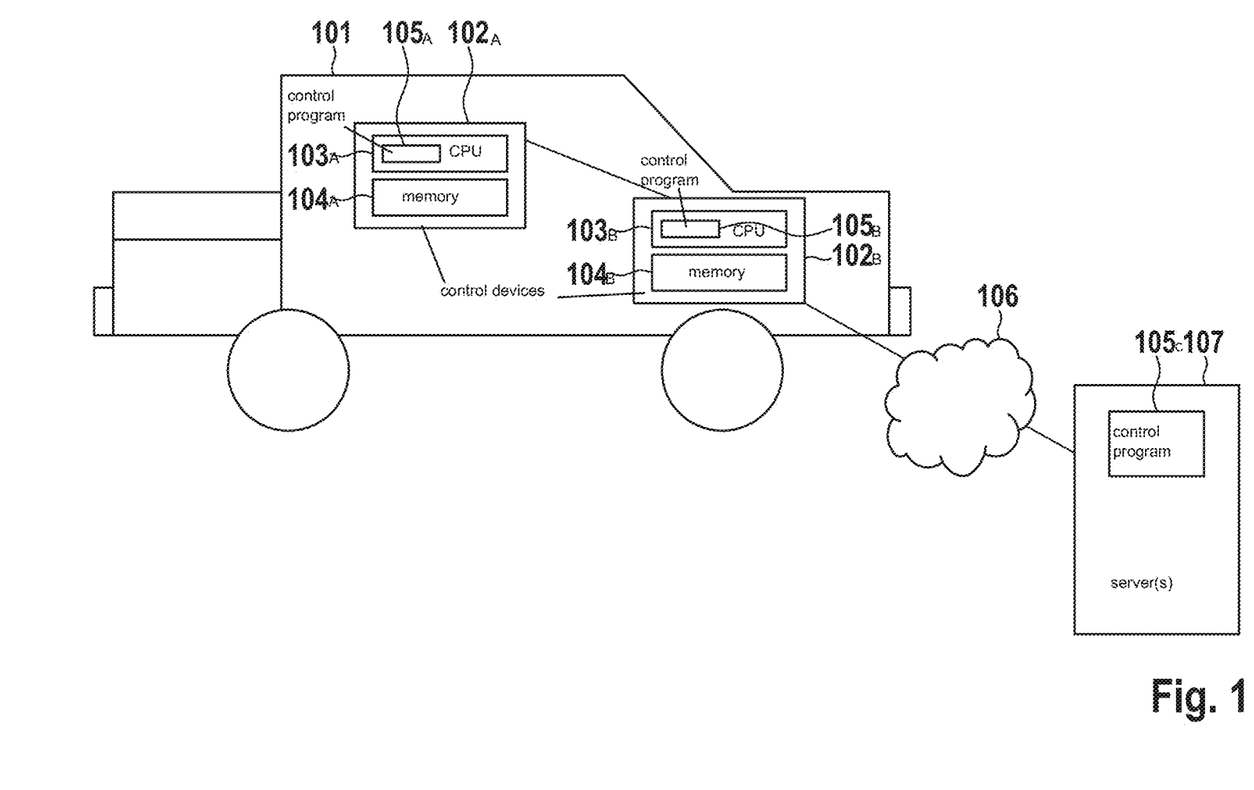
FIG. 1 shows a vehicle having multiple control devices as an example of a distributed data processing system, according to the present invention.

FIG. 1 shows a vehicle 101 having multiple control devices $102_A$, $102_B$ as an example of a distributed data processing system.

The control devices $102_A$, $102_B$ are for example electronic control units (ECUs) $102_A$, $102_B$, which respectively perform a processing operation and are connected to one another and exchange data.

Each vehicle control device $102_A$, $102_B$ has data processing components, e.g. a processor (e.g. a CPU (central processing unit)) $103_A$, $103_B$ and a memory $104_A$, $104_B$ for storing a respective control program $105_A$, $105_B$ in accordance with which the vehicle control device $102_A$, $102_B$ operates, and data that are processed by the processor $103_A$, $103_B$.

For example, the stored control program $105_A$, $105_B$ (computer program) comprises instructions for each vehicle control device, which, when executed by the respective processor $103_A$, $103_B$, cause the vehicle control devices $102_A$, $102_B$ jointly to perform driving assistance functions or event to control the vehicle 101 autonomously.

The distribution of tasks may also extend further than within vehicle 101. For example, via a network 106, a data processing task may also be given to one or multiple servers 107 (e.g. in a cloud), which likewise executes a respective control program $105_C$ (e.g. part of an overall program for the respective application), so that the distributed data processing system, which executes a respective application (as in this case controlling vehicle 101), comprises not only the control devices $102_A$, $102_B$, but also the one server or multiple servers 107. Tasks may also be distributed dynamically (in particular outsourced to the server 107) so that a dynamically distributed system exists.

In order to detect errors in the program flow or in the program execution (i.e. in the above example of the control programs 105) for an application, typically a so-called control flow analysis is performed at the time of the development for applications that have more stringent safety requirements (such as software for controlling vehicles), which is to ensure the correctness of the program flow with respect to sequences and/or time response. The automotive safety standard ISO 26262-6:2018 requires such analyses, which typically refer to the compiled software of an individual control device. For checking the program flow at run time, special hardware units (e.g. watchdog timers or ASICs) are typically used, with the aid of which deviations from the expected program flow are detected and are securely intercepted, e.g., by a control device reset or an interruption of the communication interfaces.

For distributed and asynchronous applications or applications that are executed on not exclusively used hardware units, however, the program flow control methods are not readily suitable since the program flow may vary greatly in time due to fluctuating transmission and execution times (without the execution thereby necessarily becoming faulty) and the necessary checkpoints/signatures for monitoring the correct flow sequence are generally not yet known at the time of development and compiling of an individual element in a dynamic distributed system. The application-specific control flow results only at run time through the dynamic integration of individual elements in a distributed application and must therefore be flexibly configurable at run time.

According to various specific embodiments, the program execution is verified or monitored (particularly with regard to its program flow) in that in a distributed data processing system (i.e., in a distributed execution of the respective program), additional meta data are assigned to the data that are to be processed, which on the way through the distributed data processing system (that is, through the distributed data processing pipeline for the data formed by the distributed data processing system) are modified (processed) and forwarded by the processing units (chips, control device, program modules) using a special method in such a way that defects (particularly of the program flow) become visible in the meta data. The respective data sink is then able to check on the basis of the processed meta data whether all required processing steps were carried out in the correct number and sequence.

Figure 2:
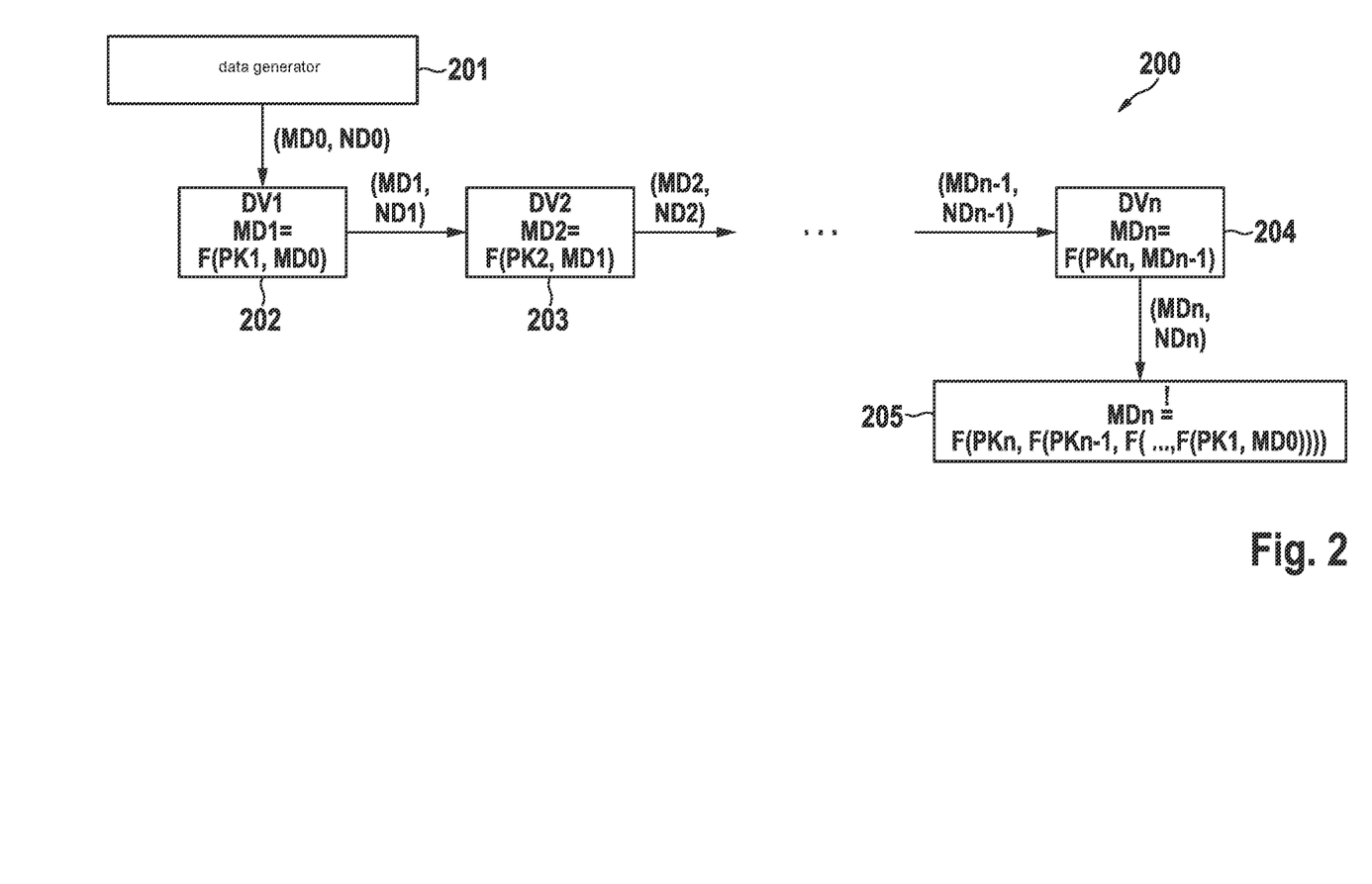
FIG. 2 illustrates a data processing pipeline, according to an example embodiment of the present invention.

FIG. 2 illustrates a data processing pipeline 200 comprising a data generator 201 (data source) for data to be processed (such as e.g. a LiDAR sensor in vehicle 101, which provides LiDAR data), multiple processing units 202, 203, 204 and a data sink 205.

According to various specific embodiments, the (payload) data ND0 to be processed are supplemented by the data generator (201) (e.g., an output interface of a sensor device) with random meta data (e.g., a random meta datum in the form of a (key) value MD0). The subsequent processing unit in the data processing pipeline 200 (e.g., a respective component that e.g. performs a preprocessing of the sensor data) applies a function (F) to the original meta datum MD0 by using a personal key (PK1) (i.e. a key assigned to this processing unit). The result of the application of the function to MD0, which is designated MD1, is forwarded together with the payload data (ND) processed by the first processing unit 202 to the next processing unit 203, which then in turn applies the function F to the meta datum MD1 by using its personal key (PK2) and so forth.

The data sink 205 ultimately contains a processed version of the original meta datum MD0, which, when each processing unit 202, 203, 204 has correctly processed the version of the meta datum it received, is $$MDn'=F(PKn,F(PKn-1,F(\ldots,F(PK1,MD0))))$$

(in the case of n processing units). This expected (reference) value MDn' is known to the data sink 205, so that that by comparing this value to the version of the meta datum it received, which was processed by the processing units 202, 203, 204, the data sink 205 is able to check whether all processing units 202, 203, 204 processed the meta datum (and thus also the payload data) in the correct sequence. If the value MDn' does not agree with the version of the meta datum it received, which was processed by the processing units 202, 203, 204, then the data sink 205 initiates a respective safety measure (e.g. reset, not using the payload data processing result, etc.).

The data sink 205 is able to ascertain the value MDn' for example from the knowledge of the original meta datum MD0, the personal keys PKi of the processing units 202, 203, 204 and the correct calculation sequence.

Depending on the complexity of the function F, the verification of the meta datum at the data sink 205 may possibly require much computing time since F is for example intentionally selected in such a way that as many processing units 202, 203, 204 as possible existing in the respective hardware are activated at least briefly. This is problematic especially if the last link of the chain (e.g. the data sink 205) is made up of markedly less powerful hardware and if a recalculation of the entire meta data processing is thus not possible in an efficient and timely manner (for example because vector/matrix operations must be calculated sequentially in a simple ALU, as a result of which the execution duration may rise exponentially).

For this reason, according to one specific embodiment, the original meta datum MD0 is selected for example as part of a sequence or numbers pseudo-randomly generated in advance, so that the result MDn' can also be calculated in advance so as to allow for a quicker check (e.g. using a look-up table) and not to have to calculate the function chain only when the data reach the data sink 205.

The function F is for example composed of different calculation operations of the respective processing unit (e.g. arithmetic-logic unit), e.g. addition, subtraction, multiplication, division as well as logical operations such as AND, OR or XOR and possibly additional vector/matrix operations or further operations of special hardware processing units (e.g. AVX or SSE; if present in the executing hardware architecture on which the respective processing unit is based). By a suitable selection of the function F, the data sink 205 is thus also able to detect errors in the calculation logic of a processing unit, since, even if the processing sequence was correct, the processed version of the meta datum received by data sink 205 does not agree with MDn' if a processing unit due to an error has calculated the function F incorrectly, e.g. because its arithmetic-logic unit is defective.

At least the end point of the processing chain, i.e. the data sink 205, for example an actuator control device in a vehicle, is located for example in an independent (secure) apparatus (e.g. a separate control device 102) in order to be able independently to check the preceding processing chain (formed by processing units 202, 203, 204).

Furthermore, the function F is selected in such a way for example that its output always has the same size, e.g. so that it outputs a 64 bit value. The input of the function may be for example the concatenation of the personal key with the respective version of the meta datum (possibly preprocessed by one or multiple preceding processing units 202, 203, 204). The function is for example selected in such a way that it is non-commutative, so that F(PKi, F(PKj, w))≠F(PKj, F(PKi, w)) always applies for example, or that an equality occurs very rarely.

Figure 3:
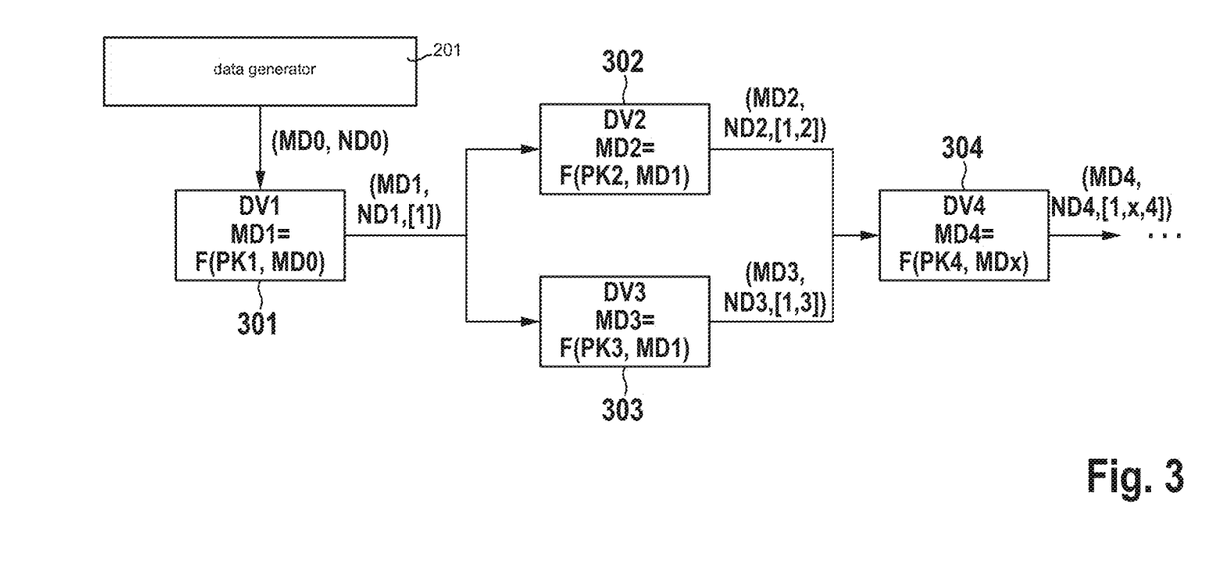
FIG. 3 illustrates a data processing operation having multiple admissible processing paths, according to an example embodiment of the present invention.

According to various specific embodiments, multiple processing paths are admissible, i.e. the data sink accepts not only the processing sequence shown in FIG. 2 or the payload data processing result (if the meta datum MD0 was processed correctly), but also the further processing path as illustrated in FIG. 3.

FIG. 3 shows a processing with multiple admissible processing paths.

In this example, first a processing is performed (if the sequence is correct) by a first processing unit 301, then a processing by a second processing unit 302 or by a processing unit 303, then by a fourth processing unit 304, possibly followed by further processing units.

Both the processing by the second processing unit 302 as well as the processing by the third processing unit 303 are admissible, and thus there are multiple admissible processing paths (in this case two, but following the fourth processing unit 304 there May be further branchings so that many different processing paths are admissible).

For example, depending on the detected scenery, an image preprocessing could follow either the one or the other calculation path. Also completely different paths would be possible here, for example direction 301, 304, since the information as to which path was taken is contained in the meta datum.

The data sink 205 (not shown in FIG. 3) is now able to check whether the version of the meta datum that it receives, for one of the admissible processing paths, agrees with the respective processed meta datum that results in the processing through the processing path, i.e. the data sink 205 may contain a list of correct processed meta data (i.e. MDn' for all admissible processing paths). If no value on the list agrees with the version of the meta datum received by data sink 205 and processed by processing units 202, 203, 204, then data sink 205 initiates a respective safety measure (e.g. reset, not using the payload data processing result, etc.).

It is also possible to add to the payload data a further meta datum, which contains identifications and sequence of the processing units that were run through (for example the vector [1,2,4] following processing by the first, second and fourth processing unit or the vector [1,3,4] following processing by the first, third and fourth processing unit). The data sink 205 is then able to check first whether the vector it receives together with the received payload data represent an admissible processing path and then whether the key MDn calculated for this purpose (that is, for the indicated sequence) agrees with the processed meta datum that it received from the last processing unit of the processing path. If the value calculated for the processing path indicated by the vector does not agree with the version of the meta datum received by the data sink 205 and processed by processing units 202, 203, 204, then data sink 205 initiates a respective safety measure (e.g. reset, not using the payload data processing result, etc.).

If the data processing system has available a description of admissible calculation paths (e.g. calculation paths allowed by the respective application), then it is possible to check (for example on the basis of a vector) even at specific locations within the processing chain, whether the preceding calculations occurred along admissible processing paths and the calculation may possible be stopped early if this is not the case.

Figure 4:
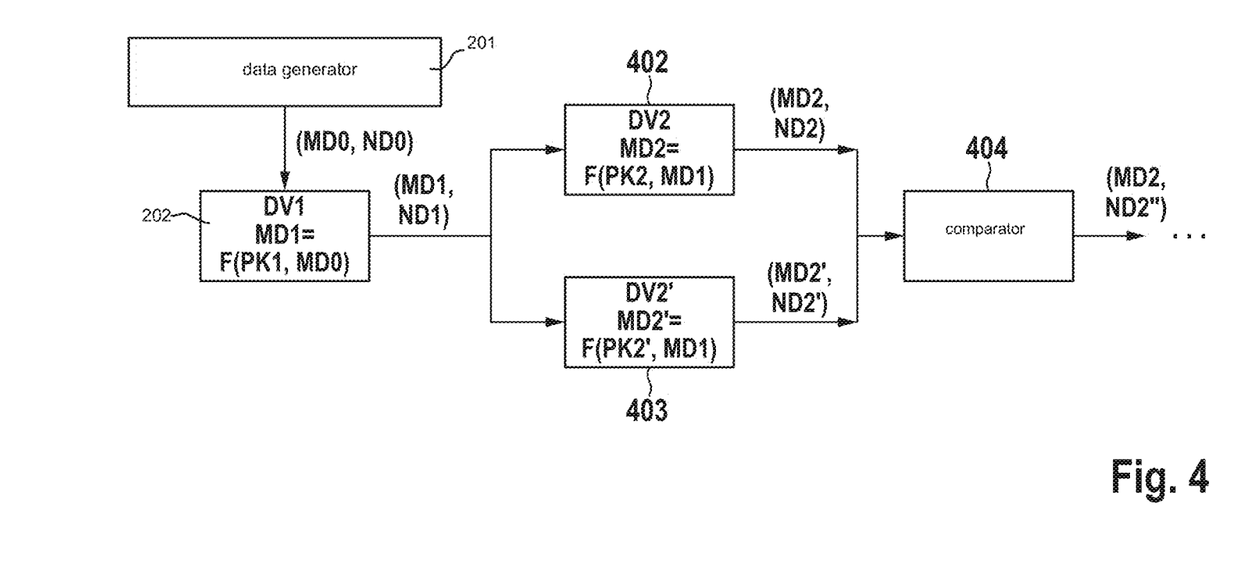
FIG. 4 shows a possibility of detecting faulty processing paths early, according to an example embodiment of the present invention.

FIG. 4 shows a further possibility of detecting incorrect processing paths early.

Here, a redundantly designed calculation (second processing unit 402 and third processing unit 403) is provided, the results of which are forwarded to a comparator 404. The task of the latter is to check the data produced by these processing units 402, 403 (this may concern the processed payload data as well as the processed meta data) whether they are identical, or possibly whether they are similar, in order to detect whether a calculation error occurred e.g. due to defective hardware. By using (i.e. comparing) the meta data MD2 and MD2' processed by the processing units 402, 403, a calculation error, which possibly resulted only in a slightly altered (but nevertheless potentially unsafe) payload data result, can be detected early and result for example in the termination of the calculation.

The approach described above may be used to check the correct and complete calculation sequence of multiple calculation components and/or to check the correct sequence of the calculations within one calculation component. For example, checkpoints may be provided in the code (a provided meta datum being processed (further) at each checkpoint), and at the end of the processing by a component, a check is performed to determine whether all checkpoints were passed in an admissible sequence. Only then will the processing by the component count as correct. The check within components allows for a fine-grained check of the program sequence.

Figure 5:
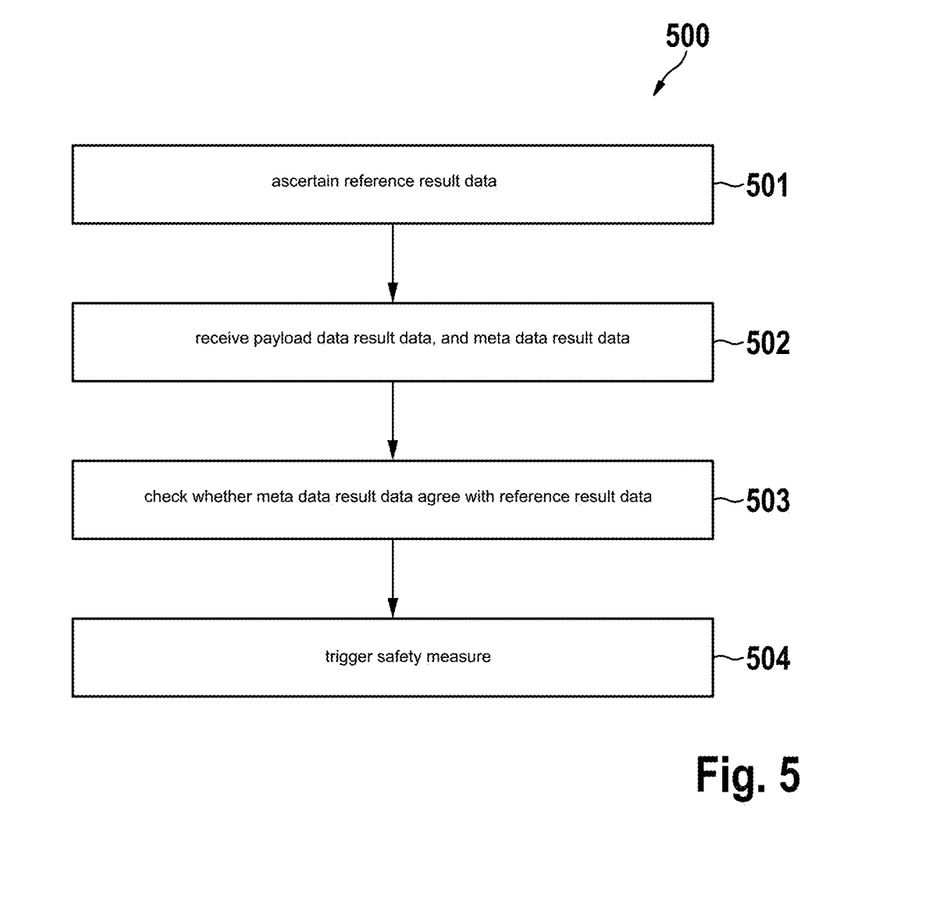
FIG. 5 shows a flow chart representing a method for checking a processing of payload data according to one specific embodiment of the present invention.

In summary, a method is provided in accordance with various specific embodiments, as illustrated in FIG. 5.

FIG. 5 shows a flow chart 500 representing a method for checking a processing of payload data according to one specific embodiment.

In 501, reference result data are ascertained for each of multiple sequences of data processing blocks that result when predetermined meta data are processed by the sequence of the data processing blocks.

In 502, payload data result data and meta data result data for a data processing of the payload data and the meta data are received.

In 503, a check is performed to determine whether the meta data result data for at least one sequence of the sequences admissible for the data processing of the payload data agree with the reference result data ascertained for the sequence.

In 504, a safety measure is triggered if the meta data result data for no sequence of the sequences admissible for the data processing agree with the reference result data ascertained for the sequence.

The reference result data may be ascertained (and stored) in advance (it being possible that the ascertainment consists merely in receiving the reference result data, e.g. from the data source) or are ascertained only after reception of the meta data result data, i.e., the sequence from 501 to 504 is not fixed to the sequence shown in FIG. 5.

The method of FIG. 5 may be carried out by one or multiple computers using one or multiple data processing units. In particular, each (or at least some) of the data processing blocks may correspond to one data processing unit. The term "data processing unit" may be understood as any type of entity that enables the processing of data or signals. The data or signals may be treated for example in accordance with at least one (i.e., one or more than one) special function that is executed by the data processing unit. A data processing unit may be an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA) or any combination thereof or may be developed from the latter. Any other manner of implementing the respective functions, which are described in more detail herein, may also be understood as a data processing unit or logic circuit system. It is also possible for one or several of the method steps described here in detail to be carried out (e.g. implemented) by a data processing unit by one or multiple special functions, which are executed by the data processing unit.

The method of FIG. 5 may be applied in particular to data processing for generating a control signal for a robotic device, e.g., from sensor data recorded by the robotic device. The term "robotic device" may be understood as referring to any technical system (having a mechanical component, whose movement is controlled), such as e.g. a computer-controlled machine, a vehicle, a household appliance, an electric tool, a production machine, a personal assistant or an access control system. A control policy for the technical system is learned and the technical system is then controlled accordingly.

Different specific embodiments may receive and use sensor signals from different sensors such as, e.g., video, radar, LiDAR, ultrasonic sensors, motion sensors, thermal imaging sensors etc., which are processed. The data processing may comprise the classification of the sensor data or the performance of a semantic segmentation on the sensor data, for example in order to detect the presence of objects (in the surroundings in which the sensor data were obtained).

Although specific embodiments were illustrated and described here, one skilled in the art recognizes that the indicated and described specific embodiments may be exchanged against a variety of alternative and/or equivalent implementations without departing from the protective scope of the present invention. This application is to cover any adaptations or variations of the specific embodiments discussed herein.

What is claimed is:

1. A method for checking a processing of payload data, comprising the following steps:
    ascertaining respective reference result data for each admissible sequence of data processing blocks of multiple admissible sequences of data processing blocks that result when predetermined meta data are processed by the admissible sequence of data processing blocks in the order of the admissible sequence of data processing blocks;

receiving, by a control device including a processor, payload data result data and meta data result data for a data processing of the payload data and the meta data;

checking whether the meta data result data received by the control device agrees with the respective reference result data ascertained for at least one admissible sequence of data processing blocks of the multiple admissible sequences of data processing blocks; and triggering a safety measure when the meta data result data received by the control device does not agree with the respective reference result data ascertained for any admissible sequence of data processing blocks of the multiple admissible sequences of data processing blocks.

2. The method as recited in claim 1, further comprising:

receiving a specification of a sequence, wherein the multiple admissible sequences includes the specified sequence.

3. The method as recited in claim 1, wherein at least one of the multiple admissible sequences is an arbitrary sequence of of data processing blocks.

4. The method as recited in claim 1, further comprising:

ascertaining, for each admissible sequence of data processing blocks, for multiple partial sequences of the admissible sequence, respective partial sequence reference result data which result when meta data are processed by the partial sequence of the data processing blocks;

receiving partial result data in addition to the meta data result data;

checking, in the event that the meta data result data received by the control device does not agree with the respective reference result data ascertained for any admissible sequence of data processing blocks of the multiple admissible sequences of data processing blocks, whether the received partial result data agrees with any partial sequence reference result data of the multiple partial sequences; and initiating a repetition of the data processing starting at an end of a partial sequence for which the respective partial sequence reference data agree with received partial result data.

5. The method as recited in claim 1, wherein several of the data processing blocks are implemented by the same data processing device.

6. A data processing device configured to check a processing of payload data, the data processing device configured to:

ascertain respective reference result data for each admissible sequence of data processing blocks of multiple admissible sequences of data processing blocks that result when predetermined meta data are processed by the admissible sequence of data processing blocks in the order of the admissible sequence of data processing blocks;

receive, by a control device including a processor, payload data result data and meta data result data for a data processing of the payload data and the meta data;

check whether the meta data result data received by the control device agrees with the respective reference result data ascertained for at least one admissible sequence of data processing blocks of the multiple admissible sequences of data processing blocks; and trigger a safety measure when the meta data result data received by the control device does not agree with the respective reference result data ascertained for any admissible sequence of data processing blocks of the multiple admissible sequences of data processing blocks.

7. A non-transitory computer-readable medium on which is stored a computer program including instructions for checking a processing of payload data, the instructions, when executed by a processor, causing the processor to perform the following steps:

ascertaining respective reference result data for each admissible sequence of data processing blocks of multiple admissible sequences of data processing blocks that result when predetermined meta data are processed by the admissible sequence of data processing blocks in the order of the admissible sequence of data processing blocks;

receiving, by a control device including a processor, payload data result data and meta data result data for a data processing of the payload data and the meta data;

checking whether the meta data result data received by the control device agrees with the respective reference result data ascertained for at least one admissible sequence of data processing blocks of the multiple admissible sequences of data processing blocks; and triggering a safety measure when the meta data result data received by the control device does not agree with the respective reference result data ascertained for any admissible sequence of data processing blocks of the multiple admissible sequences of data processing blocks.

* * * * *